(12) United States Patent
Kingman et al.

(10) Patent No.: US 11,186,146 B1
(45) Date of Patent: Nov. 30, 2021

(54) LAMINATED GLAZING

(71) Applicants: David E. Kingman, Campbell, CA (US); Derek C. Scott, Melbourne (AU); Christopher L. Porritt, Sunnyvale, CA (US); Marcelo B. da Silveira Magalhaes, Pleasanton, CA (US); Martin Melcher, Sunnyvale, CA (US); Peter F. Masschelein, San Jose, CA (US); Donald R. Monroe, Los Gatos, CA (US)

(72) Inventors: David E. Kingman, Campbell, CA (US); Derek C. Scott, Melbourne (AU); Christopher L. Porritt, Sunnyvale, CA (US); Marcelo B. da Silveira Magalhaes, Pleasanton, CA (US); Martin Melcher, Sunnyvale, CA (US); Peter F. Masschelein, San Jose, CA (US); Donald R. Monroe, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 16/438,891

(22) Filed: Jun. 12, 2019

Related U.S. Application Data

(60) Provisional application No. 62/684,306, filed on Jun. 13, 2018.

(51) Int. Cl.
*B32B 17/10* (2006.01)
*B60J 1/02* (2006.01)
(Continued)

(52) U.S. Cl.
CPC ........... *B60J 1/02* (2013.01); *B32B 17/10036* (2013.01); *B32B 17/10449* (2013.01);
(Continued)

(58) Field of Classification Search
CPC ........ B32B 17/10036; B32B 17/10174; B32B 17/10183; B32B 17/10192; B32B 17/1044; B32B 17/10449; B32B 17/10467; B32B 17/10577; B32B 17/10587; B32B 17/10568; B32B 17/1055; B32B 17/10899; B32B 2605/006; B32B 2255/10; B32B 2255/26; B32B 2250/04; B32B 2250/05; B32B 17/10761; B32B 17/10807; B32B 3/28; B32B 3/30; E06B 3/66; B60J 1/02;
(Continued)

(56) References Cited

U.S. PATENT DOCUMENTS 3,661,686 A * 5/1972 Armstrong .......... B32B 2367/00
428/164
9,606,272 B2 3/2017 Sandre-Chardonnal
(Continued)

*Primary Examiner* — Catherine A. Simone
(74) *Attorney, Agent, or Firm* — Young Basile Hanlon & MacFarlane, P.C.

(57) ABSTRACT

A laminated glazing includes a first glass layer, a second glass layer, an interlayer, and an optical coating layer. The interlayer is between the first glass layer and the second glass layer and has a first textured surface with a texture. The optical coating layer is between the interlayer and the second glass layer and includes an optical coating material. One or more of the texture or the optical coating material is different between an outer region and a central region of the laminated glazing.

24 Claims, 4 Drawing Sheets

(51) Int. Cl.
  *B60J 1/08*     (2006.01)
  *E06B 3/66*     (2006.01)
  *B60J 1/18*     (2006.01)

(52) U.S. Cl.
  CPC .. *B32B 17/10577* (2013.01); *B32B 17/10761* (2013.01); *B32B 17/10899* (2013.01); *B60J 1/08* (2013.01); *B60J 1/18* (2013.01); *E06B 3/66* (2013.01); *B32B 2250/04* (2013.01); *B32B 2250/05* (2013.01); *B32B 2255/10* (2013.01); *B32B 2255/26* (2013.01); *B32B 2605/006* (2013.01)

(58) Field of Classification Search
  CPC ....... B60J 1/08; B60J 1/18; B60J 1/06; G02B 5/021; G02B 5/0221; G02B 27/0101; Y10T 428/24926; Y10T 428/24802; Y10T 428/24521; Y10T 428/24777; Y10T 428/24488
  USPC ......................................................... 428/426
  See application file for complete search history.

(56) References Cited

U.S. PATENT DOCUMENTS

| | | | |
|---|---|---|---|
| 9,846,265 B2 | 12/2017 | Ehrensperger et al. | |
| 10,466,392 B1* | 11/2019 | Melcher | B60J 3/06 |
| 2003/0161997 A1 | 8/2003 | Moran | |
| 2004/0067339 A1 | 4/2004 | Gandon et al. | |
| 2009/0295681 A1* | 12/2009 | Kaminski | B32B 17/10036 345/7 |
| 2015/0202846 A1 | 7/2015 | Byker et al. | |

* cited by examiner

LAMINATED GLAZING

CROSS-REFERENCE TO RELATED APPLICATION(S)

This application claims priority to and the benefit of U.S. Provisional Application No. 62/684,306 filed Jun. 13, 2018, the entire disclosure of which is incorporated by reference herein.

TECHNICAL FIELD

This disclosure relates to glazings and, in particular, laminated glazings.

BACKGROUND

Glazings, such as windshields for vehicles or window panels for buildings, have optical properties, such as reflectance and optical transmittance, that provide aesthetic and functional characteristics to such glazings. For example, a film may be applied to an external surface of a glass panel, which hinder different spectrums of light from passing therethrough.

SUMMARY

Disclosed herein are implementations of laminated glazings. In one implementation, a laminated glazing includes a first glass layer, a second glass layer, an interlayer, and an optical coating layer. The interlayer is between the first glass layer and the second glass layer and has a first textured surface with a texture. The optical coating layer is between the interlayer and the second glass layer and includes an optical coating material. One or more of the texture or the optical coating material is different between an outer region and a central region of the laminated glazing.

The optical coating layer may multiple sublayers of the optical coating material, and may have more of the sublayers in the outer region than the central region. The texture may be rougher in the outer region than the central region, and may be smooth in the central region. The textured surface of one of the second glass layer or a textured interlayer may have a second textured surface nested with first textured surface of the interlayer, and the optical coating layer may be between the first textured surface and the second textured surface. The first glass layer, the second glass layer, and the interlayer may have substantially the same index of refraction.

The first glass layer may form a first outer surface of the laminated glazing, and the second glass layer may form a second outer surface of the laminated glazing with the second outer surface facing opposite the first outer surface.

In another implementation, a laminated glazing includes a first transparent layer, a second transparent layer, an interlayer between the first transparent layer and the second transparent layer. The interlayer has a texture that provides diffuse reflectance of the laminated glazing. The optical coating layer restricts optical transmittance of the laminated glazing. One or more of the diffuse reflectance or the optical transmittance varies by location of the laminated glazing. The optical transmittance may increase moving inward from an outer periphery of the laminated glazing. The diffuse reflectance may reduce moving inward from the outer periphery.

In one implementation, a method is provided for forming a laminated glazing, which includes providing a first glass layer, a second glass layer, an interlayer between the first glass layer and the second glass layer, and an optical coating between the first glass layer and the second glass layer. The method further includes forming a texture on the interlayer with an autoclave. One or more of the texture or the optical coating varies by location of the laminated glazing.

DETAILED DESCRIPTION

Referring to FIGS. 1A-1E, a laminated glazing 110 may be provided for a vehicle, such as a windshield, side window, or rear window, or another application, such as a building. As described below, the laminated glazing 110 includes various internal layers that provide desired optical properties, such as specular vs. diffuse reflectance and high vs. low optical transmittance. For example, the diffuse reflectance may provide an appearance of a matte reflection, low optical transmittance may obscure or hide underlying products, and high optical transmittance allows people to see through the laminated glazing 110.

Additionally, the optical properties may vary by location of the laminated glazing. For example, the laminated glazing 110 includes an outer periphery 112, an outer region 114, and a central region 116. A boundary between the outer region 114 and the central region 116 is represented with a dashed line. The optical properties may vary between the outer region 114 and the central region 116.

The outer region 114 of the laminated glazing 110 is positioned inward of the outer periphery 112, for example, extending inward from the outer periphery 112 approximately three inches, more, or less (e.g., within four inches, five inches or more, or two inches, one inch, or less). The outer region 114 may also vary in size, for example, being larger at a bottom end of the laminated glazing 110, and smaller at a top end and sides of the laminated glazing 110. The outer region 114 may, for example, be coupled (e.g., with an adhesive) to another structure, such as a body structure of the vehicle or a frame of the window.

The central region 116 of the laminated glazing 110 extends further inward from the outer region 114, such as extending from a portion of the outer region 114 on one side of the laminated glazing 110 to another portion of the outer region 114 on another side of the laminated glazing 110, or to the outer periphery 112 on the other side of the laminated glazing 110. The central region 116 may allow persons (e.g., occupants of the vehicle or the building) to look through the laminated glazing 110.

Figure 1A:
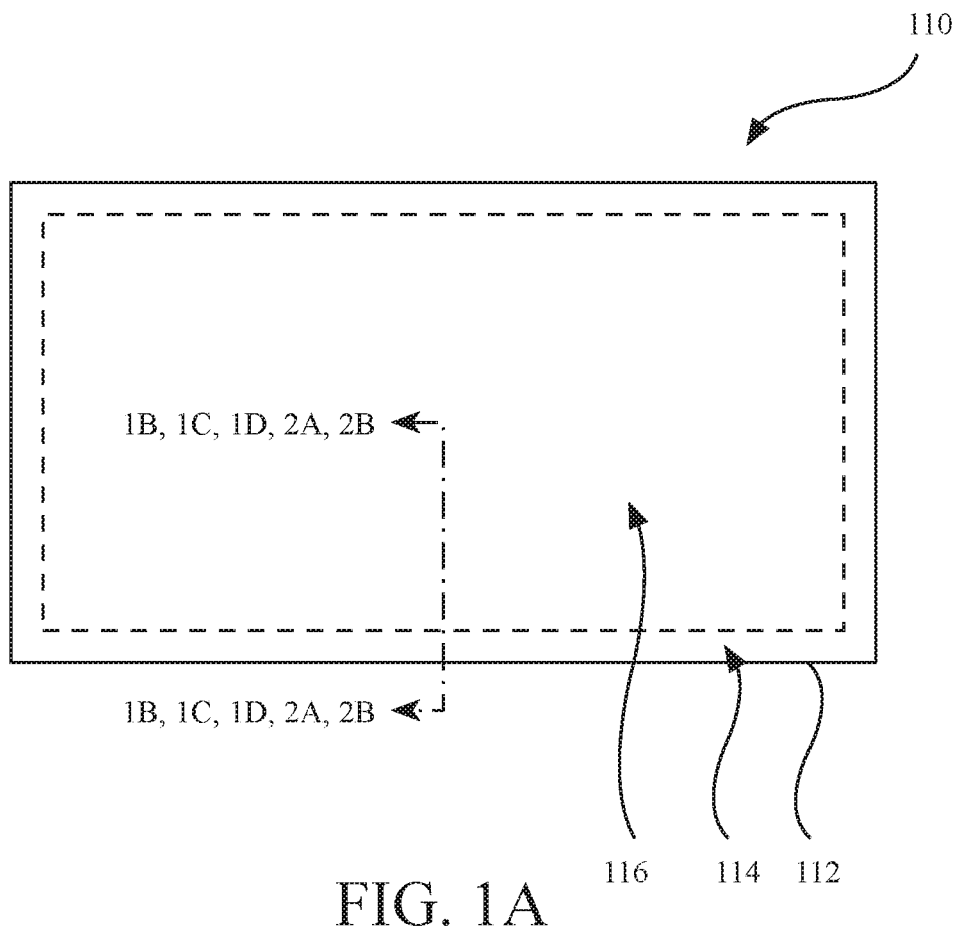
FIG. 1A is a plan view of a laminated glazing.
Figure 1B:
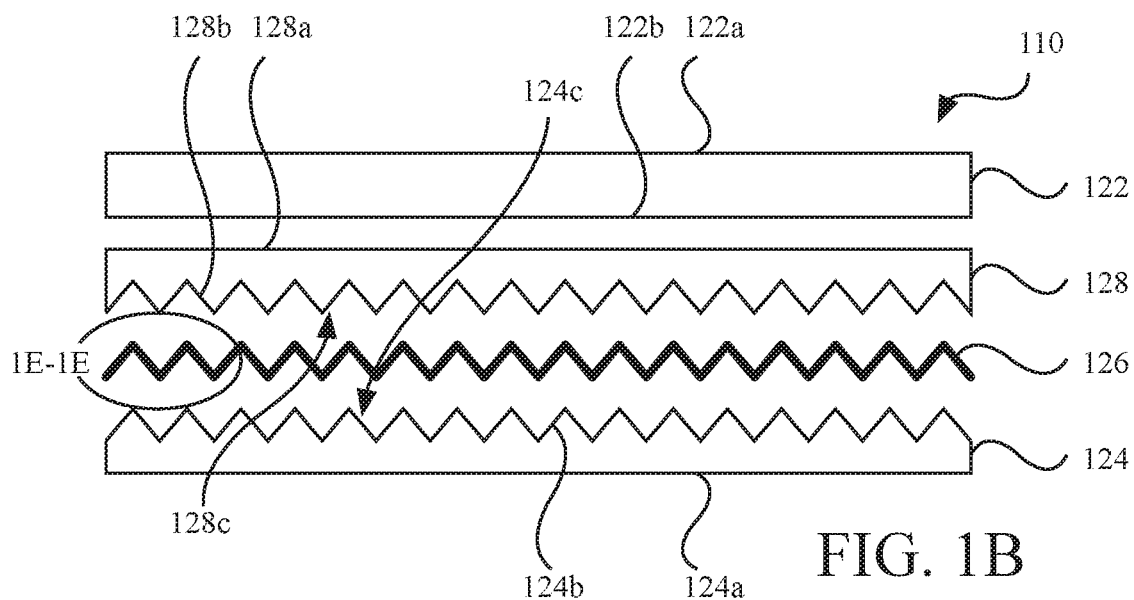
FIG. 1B is an exploded cross-sectional view of the laminated glazing of FIG. 1A taken along line 1B-1B.
Figure 1C:
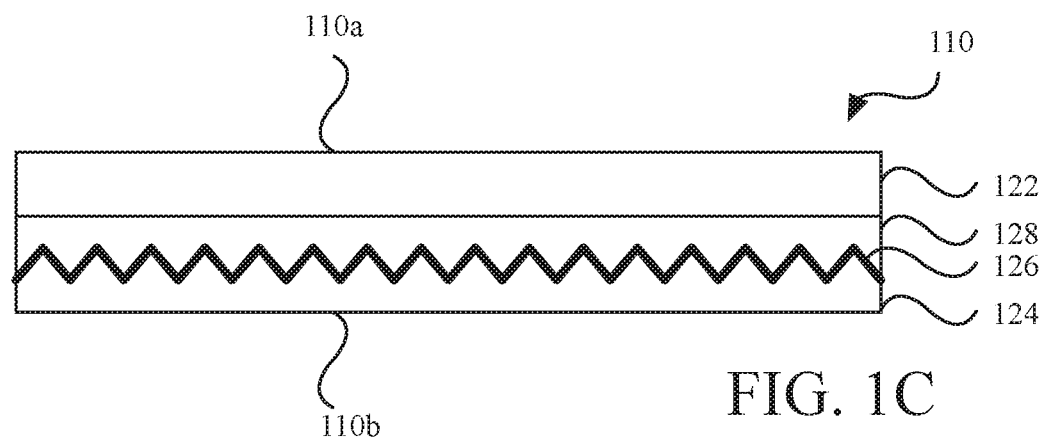
FIG. 1C is a cross-sectional view of the laminated glazing of FIG. 1A taken along line 1C-1C.

Referring to FIGS. 1B and 1C, the laminated glazing 110 includes various layers of material, which provide optical properties that may be catered to achieve desired aesthetics, privacy, and other functional purposes among other considerations. For example, the laminated glazing 110 may be configured with the various layers to provide desired levels of specular vs. diffuse reflectance (e.g., light scattering), which may provide the appearance of a matte reflection, and high to low optical transmittance (e.g., high for viewing through the laminated glazing 110, and low for hiding, obscuring, or protecting objects therebehind).

The laminated glazing 110 generally includes a first transparent layer 122 and a second transparent layer 124, as well as an optical coating layer 126 and an interlayer 128 between the first transparent layer 122 and the second transparent layer 124.

The first transparent layer 122 is formed of a highly transparent material, which allows light to pass therethrough without scattering. The first transparent layer 122 is, for example, glass but may be another highly transparent, preferably rigid, material, such as polycarbonate (PC). The first transparent layer 122 may also be referred to as a glass layer.

The first transparent layer 122 of the laminated glazing 110 includes a first surface 122a and a second surface 122b. The first surface 122a is, for example, considered an outer surface of the first transparent layer 122, while the second surface 122b is considered an inner surface thereof by facing opposite the first surface 122a inward toward the various interlayers and the second transparent layer 124 of the laminated glazing 110. The first surface 122a may also be referred to as an outer surface, while the second surface 122b may be referred to as an inner surface, of the first transparent layer 122.

The first surface 122a of the first transparent layer 122 may also form an outer surface 110a of the laminated glazing 110 (see FIGS. 1B and 1C). For example, in applications in which the laminated glazing 110 forms a barrier between an interior space (e.g., of a vehicle or a building) and an exterior space (e.g., outdoors), the first surface 122a faces and/or is exposed to the exterior space. In such applications, the first transparent layer 122 may also be referred to as the outer surface 110a of the laminated glazing 110. Alternatively, the first surface 122a may instead form an inner surface of the laminated glazing 110 in which case the first transparent layer 122 may also be referred to as an inner layer of the laminated glazing 110.

The first surface 122a of the first transparent layer 122 is smooth (e.g., has low roughness), such that light reflected from the first surface 122a is specular (e.g., light rays predominantly reflect at angles of reflection equal to their angles of incidence). One or more additional materials or coatings may be applied to the first surface 122a.

The second surface 122b may also be smooth (as shown). Alternatively, the second surface 122b may be textured in addition to and as described below for a second surface 124b of the second transparent layer 124.

The first transparent layer 122 may have a substantially constant thickness. For example, the first surface 122a is substantially parallel with the second surface 122b.

The second transparent layer 124 is also formed of a highly transparent material, so as to allow light to pass therethrough without scattering. More preferably, the second transparent layer 124 is formed of a highly transparent material having an index of refraction that is substantially the same as the material of the first transparent layer 122 (e.g., within 0.2 when measured according to standard testing methodologies). For example, the first transparent layer 122 and the second transparent layer 124 may be formed of the same material (e.g., glass or PC as described above) and, thereby have the same index of refraction. When formed of glass, the second transparent layer 124 may be referred to as a glass layer The second transparent layer 124 of the laminated glazing 110 includes a first surface 124a and the second surface 124b (referenced above). The first surface 124a is, for example, considered an outer surface of the second transparent layer 124, while the second surface 124b is an inner surface thereof by facing opposite the first surface 124a inward toward the various interlayers and the first transparent layer 122 of the laminated glazing 110. The first surface 124a may also be referred to as an outer surface, while the second surface 124b may be referred to as an inner surface, of the second transparent layer 124.

The first surface 124a of the second transparent layer 124 may also form another outer surface 110b of the laminated glazing 110, which may be referred to as an inner surface when facing an interior space, that faces opposite the outer surface 110a. For example, in those applications in which the laminated glazing 110 forms a barrier between an interior space and an exterior space, as described previously, the first surface 124a faces and/or is exposed to the interior space. In such applications, the second transparent layer 124 may also be referred to as an inner layer of the laminated glazing 110. Alternatively, the first surface 124a may form the outer surface 110a of the laminated glazing 110 in which case the second transparent layer 124 may be referred to as the outer transparent layer of the laminated glazing 110.

The first surface 124a of the second transparent layer 124 is smooth (e.g., has low roughness), such that light reflected from the first surface 124a is specular (e.g., light rays predominantly reflect at angles of reflection equal to their angles of incidence).

The second surface 124b of the second transparent layer 124 has a texture 124c that is rough (e.g., has high roughness compared to the first surface 124a), such that reflection from the laminated glazing is diffuse (e.g., light rays reflect at multiple angles). The second surface 124b may also be referred to as a textured surface.

It should be understood that the cross-sectional views of the laminated glazings 110, 210 described herein are not to scale and are schematic in nature. For example, for illustrative purposes, the magnitude of the texture 124c is exaggerated in comparison to thicknesses of the various other layers of the laminated glazings (e.g., of the first transparent layer 122, the second transparent layer 124, and the interlayer 128). In one non-limiting example, the transparent layers 122, 124 may be formed of glass and have a thickness of approximately 2 mm, while the interlayer 128 is formed of PVB and has a thickness of between approximately 0.7 and 1.0 mm, and the optical coating layer 126 has a negligible thickness relative thereto. Further, the texture 124c is illustrated as having a uniform geometry with peaks and valleys at approximately 90 degree angles with even spacing, while the texture 124c represented thereby may have different physical characteristics (e.g., more complex and/or irregular profiles and spacing).

The texture 124c of the second transparent layer 124 may be a predetermined pattern (e.g., being formed in a repeatable manner). For example, the texture 124c may be formed into the second surface 124b by embossing, while the second transparent layer 124 is in a pliable form (e.g., when forming glass). The texture 124c is formed by pressing a patterned roller or stamp against the pliable material of the second transparent layer 124, after which the material is cured. Alternatively, the texture 124c may be non-patterned. For example, the texture 124c of the second surface 124b may be created by a mechanical process that removes material (e.g., sand blasting or grinding).

The texture 124c of the second transparent layer 124 may be uniform over the entirety of the second surface 124b, such that diffuse reflectance the laminated glazing 110 is uniform. For example, the texture 124c may have a uniform roughness over the second surface 124b.

Alternatively, the texture 124c of second surface 124b may vary by location of the laminated glazing 110, such that diffuse reflectance from the laminated glazing 110 varies by location. For example, the texture 124c of the second surface 124b may provide reflectance that is more diffuse in the outer region 114 (e.g., near the outer periphery 112) and less diffuse in the central region 116. The varied diffuse reflectance may, for example, be provided by the texture 124c of the second surface 124b being more rough (e.g., rougher) in areas where reflectance is more diffuse (e.g., in the outer region 114) and less rough in areas where reflectance is less diffuse (e.g., in the central region 116). The varied diffuse reflectance may, for example, change in a stepped manner (e.g., changing abruptly from one section to another, for example, by changing roughness in a larger degree), or may change in a gradual manner (e.g., smaller stepped changes across multiple sections, such as by changing roughness in smaller degrees, or gradually following a line or curve in changing diffuse reflectance and/or roughness).

To achieve the varied diffuse reflectance, the texture 124c may be formed by the aforementioned patterned roller or stamp having greater and lesser roughness (e.g., being smooth) in different areas, or by applying the aforementioned mechanical process differently in different areas (e.g., masking areas that are to have lesser roughness, such as being smooth).

Additional manners for varying the diffuse reflectance and/or the roughness are described in further detail below with respect to FIGS. 3A-3B.

The optical coating layer 126 is configured to reflect and transmit light in desired manners and is arranged between the first transparent layer 122 and the second transparent layer 124 (e.g., between the interlayer 128 and the second transparent layer 124). For example, the optical coating layer 126 may reflect light to restrict optical transmission through the laminated glazing 110 (e.g., restricts optical transmittance of the laminated glazing 110).

The optical coating layer 126 may, for example, include a metal or reflective coating material, such as aluminum, silver, gold, or other suitable material), and/or a dielectric coating material. The optical coating layer 126 may be applied to the second surface 124b of the second transparent layer 124 in any suitable manner, such as with thin film deposition techniques (e.g., chemical deposition or physical deposition, including physical vapor deposition, such as sputtering or vacuum deposition). Further, the optical coating layer 126 may, by being a thin film material, take on the texture 124c of the underlying second surface 124b of the second transparent layer 124 (e.g., the optical coating layer 126 is textured or includes a texture that is rough). As a result, the optical coating layer 126 reflects light in a diffuse manner in accordance with the roughness of the texture 124c. The optical coating layer 126 may also be referred to as an optical layer, a reflective layer, a metal layer, or similar.

The optical coating layer 126 may, for example, include one or more optical coating sublayers 126a of optical coating material that are applied to the second surface 124b of the second transparent layer 124. The optical coating sublayers 126a are illustrated conceptually in the detail view of FIG. 1E. Based on the total number and composition of each of the optical coating sublayers 126a, the optical coating layer 126 may reflect and transmit therethrough different wavelengths of light to achieve desired aesthetic effects (e.g., high vs. low transmittance of different wavelengths of visible light) and functional effects (e.g., low transmittance of ultraviolet light).

The optical coating layer 126 may be provided in different composition and/or concentrations (e.g., areal density and/or thickness) to provide desired optical transmission properties. In one example, the optical coating layer 126 may be uniform over the laminated glazing 110. As a result, in portions having otherwise uniform characteristics (e.g., texture, materials, etc.), the laminated glazing 110 has generally uniform optical transmittance.

Alternatively, the optical coating layer 126 may be non-uniform over the laminated glazing 110. As a result, in portions having otherwise uniform characteristics, (e.g., texture, materials, etc.), the laminated glazing 110 has different optical transmission properties. For example, the optical coating layer 126 may have lower optical transmittance in the outer region 114 (e.g., near the outer periphery 112) than in the central region 116, for example, by having optical coating material in a greater concentration by including more material per unit area (e.g., thicker and/or denser). In one example, the optical coating layer 126 has a higher concentration of the optical coating material in the outer region 114 and includes no coating material in the central region 116. For example, in the outer region 114 where the laminated glazing 110 may be adhered to a body structure of a vehicle, the optical coating layer 126 may have low optical transmittance (e.g., becoming opaque), so as to prevent or limit ultraviolet rays from reaching and, thereby, prevent degradation the adhesive that secures the laminated glazing 110 to the body structure of the vehicle. The optical coating layer 126 may, by having low optical transmittance in the outer region 114, instead or additionally obscure from view the adhesive.

To vary the optical coating material in different regions of the laminated glazing 110, the optical coating sublayers 126a may be applied differently in different areas, such as being different in optical coating material and/or number of the optical coating sublayers 126a (e.g., between three and 20 of the optical coating sublayers 126a depending on the region of the laminated glazing 110). For example, the optical coating layer 126 may include a relatively high number of the optical coating sublayers 126a in the outer region 114 (e.g., 10-20 of the optical coating sublayers 126a) and relatively few of the optical coating sublayers 126a in the central region 116 (e.g., 0-5 of the optical coating sublayers 126a). As a result, the outer region 114 may have relatively low optical transmittance, while the central region 116 may have relatively high optical transmittance.

The optical coating layer 126 may change in a stepped manner (e.g., changing abruptly between levels of optical transmittance, such as by changing abruptly from one concentration of coating material in one region to another), or may change in a gradual manner (e.g., changing in optical transmittance and/or material in more and smaller steps, or in smooth manner, such as with a gradient).

As referenced above, the optical coating layer 126 may be applied to the second surface 124b of the second transparent layer 124 in any suitable manner. To achieve the varied amount and/or composition of coating material at different locations, the second surface 124b of the second transparent layer 124 may be masked when different ones of the optical coating sublayers 126a are applied. Alternatively, the optical coating layer 126 may be applied using deposition techniques that otherwise allow for localized application of the optical coating material.

Additional manners for varying optical transmission and/or the optical coating material are described in further detail below with respect to FIGS. 3A-3B.

Figure 1D:
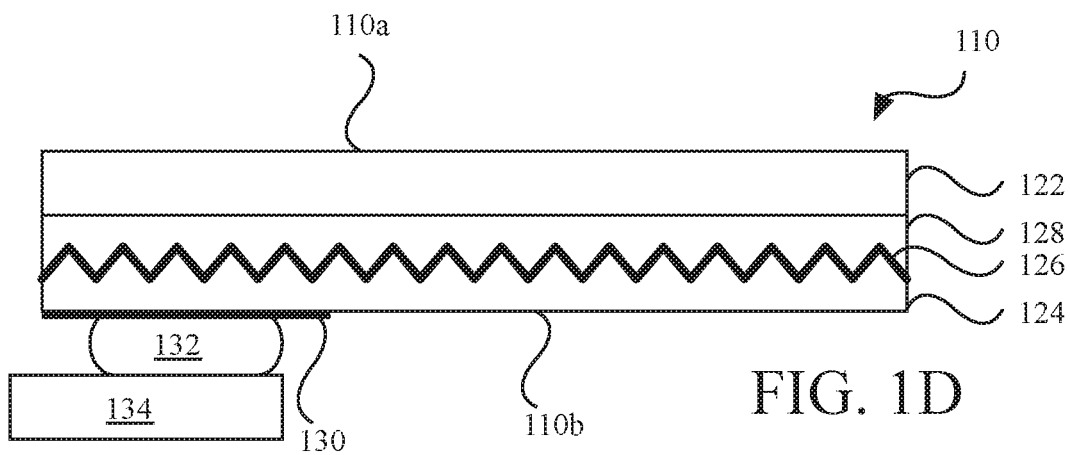
FIG. 1D is a cross-sectional view of the laminated glazing of FIG. 1A taken along line 1D-1D an in a stated coupled to an underlying structure.
Figure 1E:
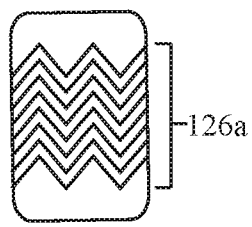
FIG. 1E is a detail view of an optical coating layer of the laminated glazing taken from line 1E-1E in FIG. 1B.

Still further, referring to FIG. 1D, the laminated glazing 110 may include an opaque layer 130, such as a dark ink, which may be positioned away from the outer surface 110a of the laminated glazing 110. The opaque layer 130, for example, may be positioned between the first transparent layer 122 and the second transparent layer 124, or on the outer surface 110b of the laminated glazing 110 (as shown). The opaque layer 130 functions to obscure from view and prevent UV degradation of an adhesive 132 thereunder, which is used to couple the laminated glazing 110 to an underlying structure 134 (e.g., of the vehicle or building). When positioned on the outer surface 110b of the laminated glazing 110, as shown, the opaque layer 130 may aid adherence of the laminated glazing 110 to the adhesive 132. The texture 124c and/or the optical coating layer 126 may obscure the opaque layer 130 from view.

The interlayer 128 is arranged between the first transparent layer 122 and the second transparent layer 124 and is directly or indirectly coupled (e.g., bonded) thereto. The interlayer 128 is a layer of a polymer material, which is positioned between the first transparent layer 122 and the optical coating layer 126.

The interlayer 128 has an index of refraction that is substantially the same as the first transparent layer 122 and the second transparent layer 124. For example, the interlayer 128 may have an index of refraction that is within 0.2 of the first transparent layer 122 and the second transparent layer 124, so as to be substantially the same. In one example, the interlayer 128 is a polymer, such as polyvinyl butyral (PVB). Polyvinyl butyral has an index of refraction of approximately 1.485 to 1.490, which is within 0.2 of the refractive indices for glass materials (e.g., typically around 1.47 to 1.52 in automotive applications) that may form the first transparent layer 122 and/or the second transparent layer 124. The interlayer 128 may also be referred to as a polymer, PVB, or bonding interlayer.

As discussed in further detail below, the interlayer 128 includes a texture 128c that conforms with the texture 124c of the second transparent layer 124. With the second transparent layer 124 and the interlayer 128 having substantially the same index of refraction, in regions where the optical coating 126 is not present, light is transmitted through the interface between the textures 124c, 128c without distortion (e.g., without scattering). That is despite the roughness of the textures 124c, 128c, if none of the optical coating material is present therebetween to reflect light, the matching index of refraction will allow light to transmit therethrough without scattering (e.g., being transparent).

The interlayer 128 includes a first surface 128a and a second surface 128b. The first surface 128a is arranged adjacent the second surface 122b of the first transparent layer 122 and conforms therewith, for example, being smooth. The first surface 128a may be continuously bonded to the first transparent layer 122, such as through an autoclave process.

The second surface 128b of the interlayer 128 is arranged adjacent the second transparent layer 124 and/or optical coating layer 126 therebetween and is bonded thereto. The texture 128c of the second surface 128b additionally conforms with the texture 124c of the second transparent layer 124 (e.g., with or without the optical coating layer 126 therebetween). The texture 128c is complementary to the texture 124c of the second surface 124b of the second transparent layer 124 and/or that of the optical coating layer 126 (e.g., having a complementary shape so as to be nested therewith). For example, the second surface 128b may be continuously bonded to the second transparent layer 124 and/or the optical coating layer 126 to prevent gaps or gaseous pockets therebetween, which might otherwise create optical imperfections in the laminated glazing 110.

The texture 128c of the interlayer 128 is formed, for example, with an autoclave (e.g., a glass laminating autoclave). During an autoclave process the first transparent layer 122, the second transparent layer 124 and the optical coating layer 126, and the interlayer 128 are bonded together. During the autoclave process, the material (e.g., PVB) of the interlayer 128 may be provided as a sheet material have two generally smooth surfaces, which is heated to become pliable and under pressure conforms to the texture 124c of the second transparent layer 124 to form the texture 128c.

Figure 2A:
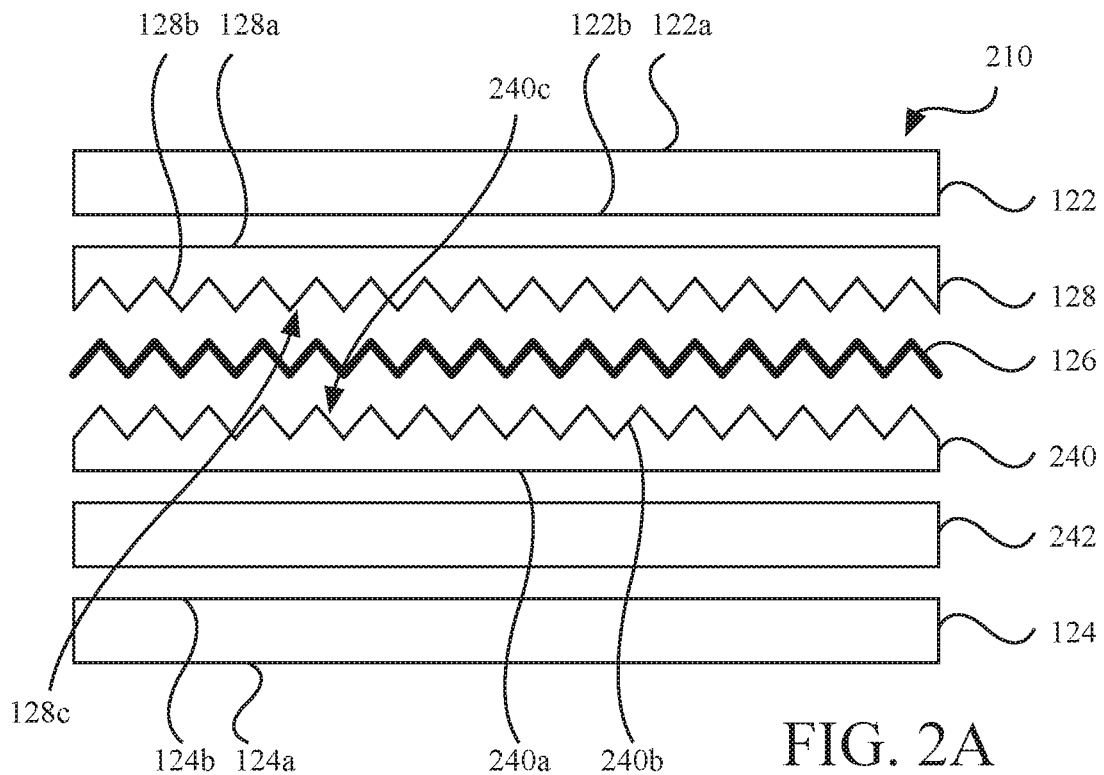
FIG. 2A is an exploded cross-sectional view of a variation of the laminated glazing of FIG. 1A.
Figure 2B:
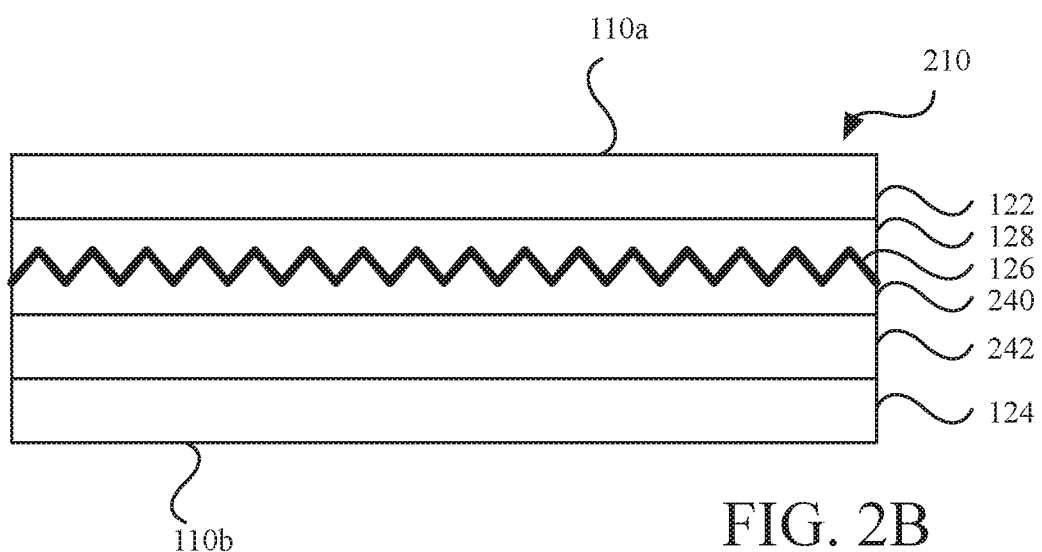
FIG. 2B is a cross-sectional view of the laminated glazing of FIG. 2A.

Referring to FIG. 2, a laminated glazing 210 is an alternative to the laminated glazing 110. As compared to the laminated glazing 110, the laminated glazing 210 additionally includes a textured interlayer 240 and a second interlayer 242. Further, the second surface 124b of the second transparent layer 124 is smooth (e.g., not have the texture 124c), while the textured interlayer 240 includes a texture 240c to which the optical coating layer 126 is applied.

The textured interlayer 240 has an index of refraction that is substantially the same as the first transparent layer 122, the second transparent layer 124, and the first interlayer 128. The textured interlayer 240 may, for example, be a polymer, such as polyethylene terephthalate (PET) or polycarbonate (PC). PET has an index of refraction of 1.575 and PC has an index of refraction of 1.6, which are within 0.2 of glass (as described above) and PVB. With the textured interlayer 240 and the first interlayer 128 having the same index of refraction, light is transmitted through the interfaces between the textures 124c, 240c without distortion (e.g., scattering).

The textured interlayer 240 includes a first surface 240a and a second surface 240b. The first surface 240a conforms with and is bonded to the second transparent layer 124 (e.g., being smooth).

The second surface 240b includes the texture 240c, which may be configured and/or formed in the manners described above for the texture 124c of the second transparent layer 124 to provide diffuse reflectance (e.g., varying in texture or roughness and being formed by a pressing or mechanical process).

The texture 128c of the first interlayer 128 is configured with respect to the texture 240c of the textured interlayer 240 similar to that of the texture 124c of the second transparent layer 124 described above. That is, the texture 128c is complementary to the texture 240c and/or that of the optical coating layer 126 (e.g., conforming therewith). For example, the second surface of the first interlayer 128 may be continuously bonded second surface 240b of the textured interlayer 240 and/or the optical coating layer 126 to prevent gaps or gaseous pockets therebetween, which might otherwise create optical imperfections in the laminated glazing 210.

The optical coating layer 126 may be applied to the first surface 240a of the textured interlayer 240, as was described previously when applied to the second transparent layer 124 (e.g., varying by position and being applied with a deposition process).

The texture 128c of the first interlayer 128 may be formed when the first interlayer 128 is coupled to the textured interlayer 240, such as during heated press operation, which may be separate from or part of the autoclave operation described above.

The second interlayer 242 bonds the textured interlayer 240 to the second transparent layer 124. The second interlayer 242 has an index of refraction that is substantially the same as the first transparent layer 122, the second transparent layer 124, the first interlayer 128, and the textured interlayer 240. The second interlayer 242 may, for example, be a polymer material, such as PVB, and may be the same material as the first interlayer 128. The second interlayer 242 is coupled to the textured interlayer 240 during a heated press operation, which may be separate from or part of the autoclave operation. The first interlayer 128, the optical coating layer 126, the textured interlayer 240, and the second interlayer 242 may be coupled to each other to first form an interlayer assembly, which is then coupled to the first transparent layer 122 and the second transparent layer 124 during a subsequent autoclave process.

Figure 3A:
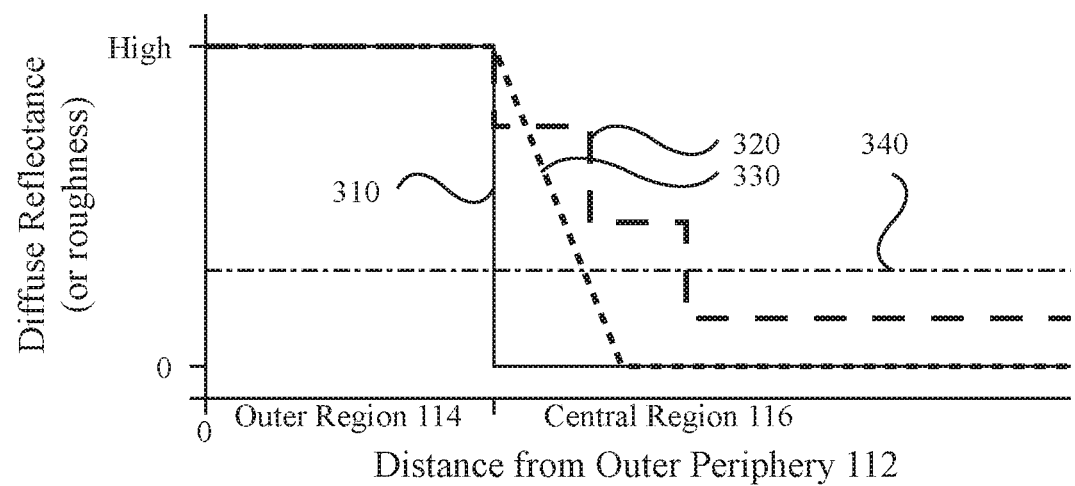
FIG. 3A is a plot of various applications diffuse reflectance vs. position of the laminated glazing.
Figure 3B:
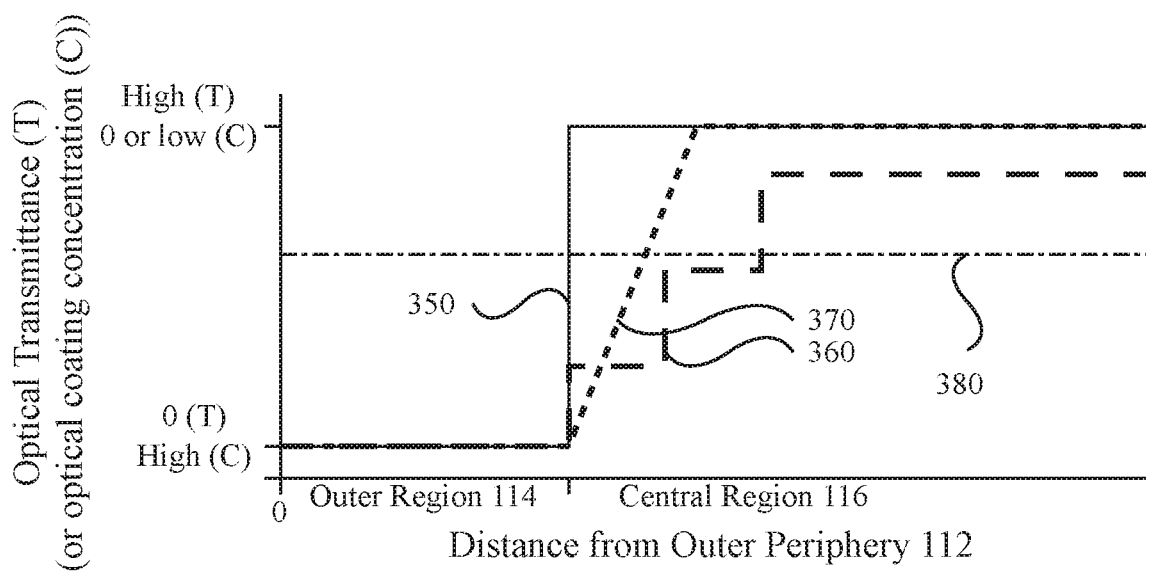
FIG. 3B is a plot of various applications of optical transmittance vs. position of the laminated glazing.

Referring to FIGS. 3A-3B, the diffuse reflectance (e.g., the roughness of the texture 124c) and the optical transmittance (e.g., inversely related to the concentration of the optical coating material) may vary by position with respect to the outer periphery 112, the outer region 114, and the central region 116. The diffuse reflectance and the optical transmittance of the laminated glazings 110, 210 are provided at levels in the outer region 114, the central region 116, and a transition region therebetween over which the level of diffuse reflectance and optical reflectance change in the manners described above and below. It should be understood that the levels in each such region may be combined with each other in any desired manner.

Referring to FIG. 3A, diffuse reflectance (of the laminated glazings 110, 210) and roughness (of the textures 124c, 128c, 240c) is on the Y-axis, while the distance from the outer periphery 112 is on the X-axis (zero representing the outer periphery 112). The diffuse reflectance and the roughness for a given application are illustrated with a single line, but it should be noted that the relationship may not be linear (e.g., varying roughness by a certain degree may not result in varying diffuse reflectance by the same degree).

In a first application 310 (solid line), the diffuse reflectance and/or the roughness is at a constant high level in the outer region 114, is maintained at zero in the central region 116, and transitions therebetween in an abrupt manner (i.e., a single step drop). In a second application 320 (long dashed line), the diffuse reflectance and/or the roughness is maintained at a high level in the outer region 114, is maintained at a constant low (non-zero) level in the central region 116, and transitions therebetween in a gradual stepped manner (e.g., multiple step drop). In a third application 330 (short dashed line), the diffuse reflectance and/or the roughness is maintained at a high level in the outer region 114, is maintained at a zero in the central region 116, and transitions therebetween in a gradient manner. In a fourth application 340 (dash-dot line), the diffuse reflectance and/or the roughness is maintained at the same low level in the outer region 114 and the central region 116 with no transition therebetween.

It should be understood that the diffuse reflectance and/or roughness of the textures 124c, 128c, 240c may be varied in other manners, for example, by increasing from the outer region 114 to the central region 116 and/or by changing within the outer region 114. It should be further understood that the diffuse reflectance and/or the roughness may be the same or different at each peripheral location around the outer periphery 112 (e.g., between the top, bottom, left side, and right side, and/or along a given side).

Referring to FIG. 3B, optical transmittance (of the laminated glazings 110, 210) and the concentration of the optical coating material (of the optical coating layer 126) is on the Y-axis, while the distance from the outer periphery 112 is on the X-axis (zero representing the outer periphery 112). The optical transmittance and the concentration for a given application are illustrated with a single line, but it should be noted that the optical transmittance (denoted by a "T") and the concentration of the optical coating material (denoted by a "C") have an inverse relationship, such that less optical coating material generally results in higher transmittance and vice versa, but that the relationship may not be linear (e.g., varying the concentration of the optical coating material may not result in varying transmittance by the same degree).

In a first application 350 (solid line), the optical transmittance is at a constant low level in the outer region 114 (e.g., zero or near zero with a high concentration of optical coating material), is maintained at a high level in the central region 116 (e.g., with low concentration or no optical coating material), and transitions therebetween in an abrupt manner (i.e., a single step increase). In a second application 360 (long dashed line), the optical transmittance is maintained at a low level (e.g., zero or near zero with high concentration) in the outer region 114, is maintained at a constant high level in the central region 116 (e.g., with low concentration or no optical coating material), and transitions therebetween in a gradual stepped manner (e.g., multiple step increases). In a third application 370 (short dashed line), the optical transmittance is maintained at a low level in the outer region 114 (e.g., zero or near zero with a high concentration), is maintained at a constant high level in the central region 116 (e.g., with low concentration or no optical coating material), and transitions therebetween in a gradient manner. In a fourth application 380 (dash-dot line), the optical transmittance is maintained at the level in the outer region 114 and the central region 116 with no transition therebetween (e.g., with the same concentration).

It is contemplated that any one of the applications 350, 360, 370, 380 of the optical transmittance may be used in conjunction with any one of the applications 310, 320, 330, 340 of the diffuse reflectance. It should also be understood that the optical transmittance and/or optical coating may be varied in other manners, for example, by increasing from the outer region 114 to the central region 116 and/or by changing within the outer region 114. It should be further understood that the optical transmittance and/or the optical coating may be the same or different at each peripheral location (e.g., between the top, bottom, left side, and right side, and/or along a given side).

What is claimed is:

1. A laminated glazing comprising:
a first glass layer;
a second glass layer;
an interlayer between the first glass layer and the second glass layer and having a first textured surface with a texture; and an optical coating layer between the interlayer and the second glass layer and having an optical coating material;

wherein one or more of the texture or the optical coating material is different between a first region and a second region of the laminated glazing, the first region being within five inches of one side of the laminated glazing and the second region extending from the first region toward another side of the laminated glazing.

2. The laminated glazing according to claim 1, wherein the texture is rougher in the first region than the second region.

3. The laminated glazing according to claim 2, wherein the first textured surface is smooth in the second region.

4. The laminated glazing according to claim 1, wherein the optical coating material has a concentration that is greater in the first region than in the second region.

5. The laminated glazing according to claim 4, wherein the concentration is zero in the second region.

6. The laminated glazing according to claim 4, wherein the texture is rougher in the first region than in the second region.

7. The laminated glazing according to claim 6, wherein the first textured surface is smooth in the second region.

8. The laminated glazing according to claim 1, wherein a textured surface of one of the second glass layer or a textured interlayer has a second textured surface nested with the first textured surface of the interlayer, the optical coating layer between the first textured surface and the second textured surface.

9. The laminated glazing according to claim 8, further comprising the textured interlayer with the second textured surface, and another interlayer between the textured interlayer and the second glass layer.

10. The laminated glazing according to claim 8, wherein the second glass layer includes the second textured surface.

11. The laminated glazing according to claim 1, wherein the first glass layer, the second glass layer, and the interlayer have substantially the same index of refraction.

12. The laminated glazing according to claim 1, wherein the optical coating layer includes multiple sublayers of the optical coating material, the optical coating layer having more of the sublayers in the first region than the second region;

wherein the texture is rougher in the first region than the second region, and is smooth in the second region;

wherein a textured surface of one of the second glass layer or a textured interlayer has a second textured surface nested with the first textured surface of the interlayer, the optical coating layer between the first textured surface and the second textured surface; and wherein the first glass layer, the second glass layer, and the interlayer have substantially the same index of refraction.

13. The laminated glazing according to claim 1, wherein the second region is a central region that extends from the first region on the one side of the laminated glazing to the first region on the other side of the laminated glazing.

14. A laminated glazing comprising:
a first glass layer;
a second glass layer;
an interlayer between the first glass layer and the second glass layer and having a first textured surface with a texture; and an optical coating layer between the interlayer and the second glass layer and having an optical coating material;

wherein one or more of the texture or the optical coating material is different between an outer region and a central region of the laminated glazing;

wherein the optical coating material has a concentration that is greater in the outer region than in the central region; and wherein the optical coating layer includes multiple sublayers of the optical coating material, the optical coating layer having more of the sublayers in the outer region than the central region.

15. A laminated glazing comprising:
a first transparent layer;
a second transparent layer;
an interlayer between the first transparent layer and the second transparent layer and having a texture that provides diffuse reflectance of the laminated glazing; and an optical coating layer that restricts optical transmittance of the laminated glazing;

wherein one or more of the diffuse reflectance or the optical transmittance varies in a gradual manner between locations of the laminated glazing.

16. The laminated glazing according to claim 15, wherein the diffuse reflectance reduces moving inward from an outer periphery of the laminated glazing.

17. The laminated glazing according to claim 16, wherein the texture decreases gradually in roughness moving inward from the outer periphery.

18. The laminated glazing according to claim 15, wherein the optical transmittance increases moving inward from an outer periphery of the laminated glazing.

19. The laminated glazing according to claim 18, wherein the optical coating layer decreases gradually in concentration moving inward from the outer periphery.

20. The laminated glazing according to claim 18, wherein the diffuse reflectance reduces moving inward from the outer periphery.

21. The laminated glazing according to claim 15, wherein the one or more of the diffuse reflectance or the optical transmittance varies in a gradual stepped manner with multiple stepped changes between locations of the laminated glazing.

22. The laminated glazing according to claim 15, wherein the one or more of the diffuse reflectance or the optical transmittance varies in a gradient manner between locations of the laminated glazing.

23. The laminated glazing according to claim 16, wherein the optical transmittance increases moving inward from the outer periphery of the laminated glazing.

24. The laminated glazing according to claim 23, wherein the texture decreases gradually in roughness moving inward from the outer periphery, and wherein the optical coating layer decreases gradually in concentration moving inward from the outer periphery.

* * * * *